US006973337B2

(12) United States Patent
Jiguet et al.

(10) Patent No.: US 6,973,337 B2
(45) Date of Patent: Dec. 6, 2005

(54) APPARATUS FOR THE MOBILE COMMUNICATION DEVICE IN LOW POWER CONSUMPTION USING LDO REGULATOR WITH SLEEP MODE

(75) Inventors: Jean-Christophe Jiguet, Antibes (FR); Lorenzo Indiani, Villeneuve Loubet (FR)

(73) Assignee: Texas Instruments Incorporated, Dallas, TX (US)

(*) Notice: Subject to any disclaimer, the term of this patent is extended or adjusted under 35 U.S.C. 154(b) by 494 days.

(21) Appl. No.: 10/225,748

(22) Filed: Aug. 22, 2002

(65) Prior Publication Data

US 2003/0211870 A1 Nov. 13, 2003

(30) Foreign Application Priority Data

May 10, 2002 (EP) ................................ 02076853

(51) Int. Cl.[7] ................................ H04B 1/38
(52) U.S. Cl. ................ 455/574; 455/127.5; 455/343.5; 323/274
(58) Field of Search ............................ 455/574, 127.5, 455/343.5; 323/274, 284

(56) References Cited

U.S. PATENT DOCUMENTS

| | | | | |
|---|---|---|---|---|
| 6,031,362 | A * | 2/2000 | Bradley | 323/269 |
| 6,236,194 | B1 * | 5/2001 | Manabe et al. | 323/274 |
| 6,441,591 | B2 * | 8/2002 | Nokkonen | 323/266 |
| 6,677,735 | B2 * | 1/2004 | Xi | 323/273 |
| 6,806,690 | B2 * | 10/2004 | Xi | 323/273 |

FOREIGN PATENT DOCUMENTS

| | | |
|---|---|---|
| EP | 0 686 903 A2 | 12/1995 |
| EP | 1 361 664 A1 | 11/2003 |

* cited by examiner

*Primary Examiner*—Tilahun Gesesse
(74) *Attorney, Agent, or Firm*—Ronald O. Neerings; Wade James Brady, III; Frederick J. Telecky, Jr.

(57) ABSTRACT

A mobile communications device (50) includes a plurality of LDOs (30) for supplying a stable voltage to various circuits on the device. In a normal mode, the LDO's main bandgap voltage source (12) supplies a voltage to a main amplifier (16). During deep sleep mode, sleep logic (40) places the LDOs in a sleeping state, where a low current sleep bandgap voltage source (32) supplies a voltage to a smaller, sleep amplifier (36), which maintains a charge on capacitors (24, 26) for a fast transitions to a full ON state.

7 Claims, 2 Drawing Sheets

APPARATUS FOR THE MOBILE COMMUNICATION DEVICE IN LOW POWER CONSUMPTION USING LDO REGULATOR WITH SLEEP MODE

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to a mobile communications device with low power consumption.

2. Description of the Related Art

Mobile communication devices have become a primary source of communication. In particular, mobile phones now account for a large percentage of the number of phones sold around the world.

A major distinguishing factor between various mobile phones concerns battery life and, specifically, standby time. Even when a mobile phone is not involved in voice communications, its circuitry is powered to allow background communications with the base stations, known as "paging mode". During periods of inactivity, paging mode occurs infrequently, about 10% of the time with the remainder of the time being a "deep sleep" mode in which most of the system circuitry is disabled or placed in a suspended state. In deep sleep mode, typical systems stop the high frequency clock to reduce dynamic consumption and set unused circuitry blocks in powerdown.

While deep sleep mode reduces power consumption, the analog portion of a mobile device remains in an active state in order to support the digital and RF (radio frequency) portions when paging mode occurs. Specifically, the LDO (low drop-out) regulators are kept in an ON state in order to maintain context and data (some LDOs that are not used for context or data retention may be placed in an OFF state). Maintaining the analog portion in an active state can significantly drain current from the battery during standby, since the active LDOs exhibit full quiescent current consumption. Further, LDOs in an OFF state have a slow transition time to the ON state, compared to GSM requirements.

Accordingly, a need has arisen for a method and apparatus to reduce power consumption during standby time.

BRIEF SUMMARY OF THE INVENTION

In the present invention, a mobile communication device comprises digital baseband circuitry, radio frequency modulation circuitry, and power circuitry for powering said digital baseband circuitry and said radio frequency modulation circuitry. The power circuitry includes one or more regulators including a first voltage reference, a second voltage reference with a significantly lower current consumption than the first voltage reference, a bias current supply, a first amplifier, a second amplifier which consumes less bias current consumption than the first amplifier, and sleep logic. The sleep logic couples the first voltage reference to the first amplifier and the bias current supply to the first amplifier in a normal mode and couples the second voltage reference to the second amplifier and the bias current supply to the second amplifier in a sleep mode.

The present invention provides significant advantages over the prior art. First, there is a drastic reduction of current consumption during periods in which there is no need for maximum rated current or high precision on load and line regulation. Second, the only a small addition of circuitry is necessary to implement the sleep mode in the regulators.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
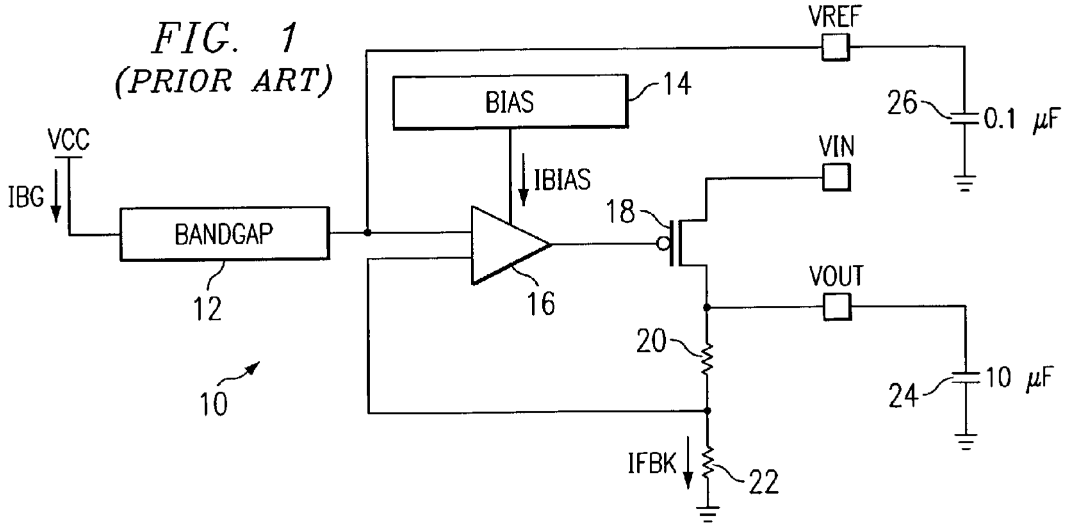
FIG. 1 (PRIOR ART)
FIG. 1 illustrates a schematic of a prior art LDO circuit.
Figure 2:
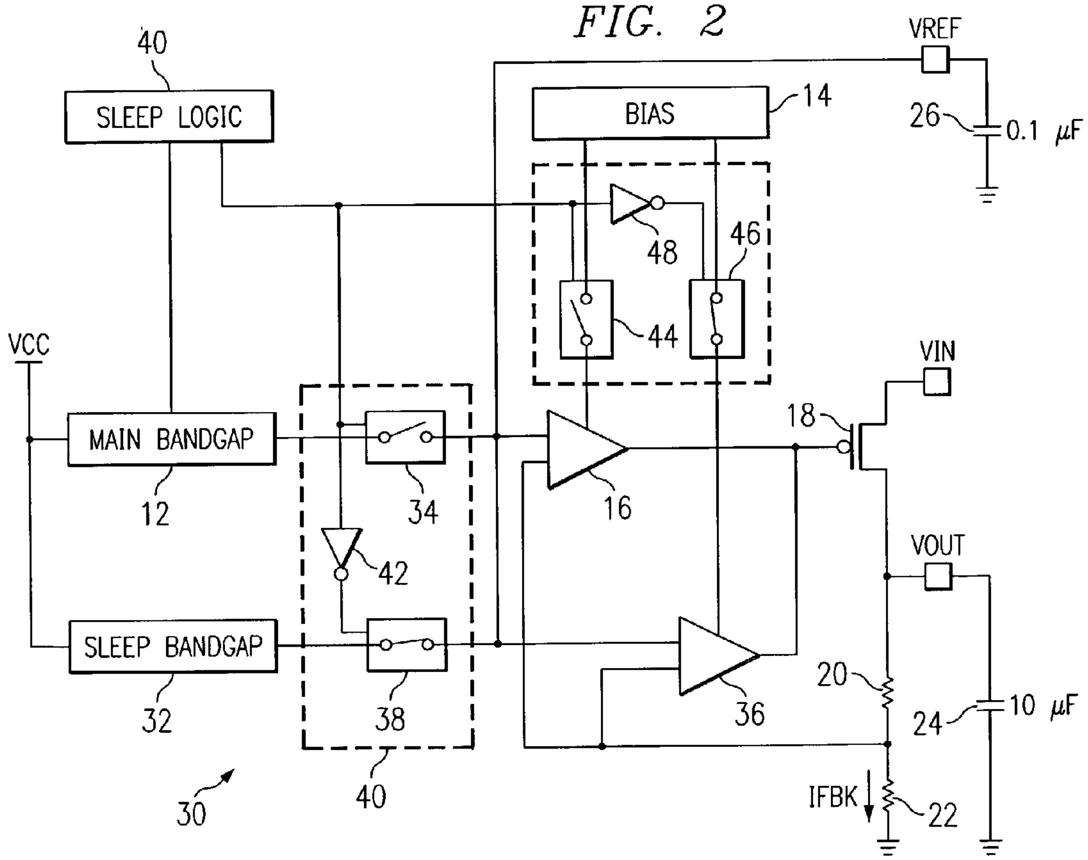
FIG. 2 illustrates a schematic of an LDO with a low current consumption (sleep) state.
Figure 3:
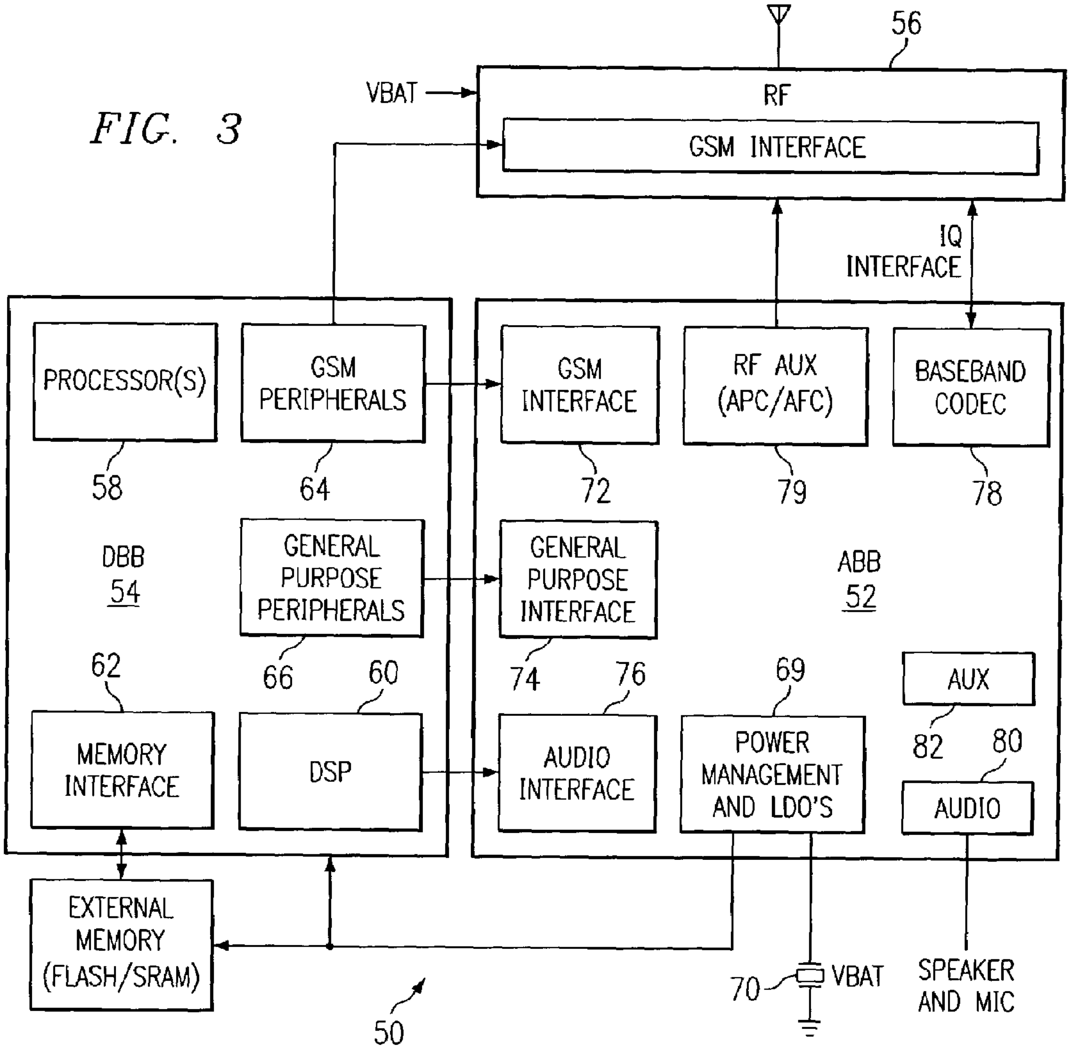
FIG. 3 illustrates a general block diagram of a mobile phone using the LDOs of FIG. 2.

The present invention is best understood in relation to FIGS. 1–3 of the drawings, like numerals being used for like elements of the various drawings.

FIG. 1 illustrates a block diagram of a prior art LDO (low dropout regulator). LDOs are a special type of regulator where the minimum voltage required between the input and the output (the dropout voltage) is particularly low. This allows a battery to continue to power the LDO almost until the battery voltage drops to the level of the desired output. LDOs are thus used to provide a stable voltage source for the other circuitry in the mobile communication devices, such as the processors (general purpose and digital signal processors), memory, input/output, and other peripherals.

In the LDO 10 of FIG. 1, a bandgap voltage source 12 provides a reference voltage (VREF) to, the input of amplifier 16. Supply voltage (VCC) is coupled to the bandgap voltage source 12. A bias current source 14 provides current to amplifier 16. The output of amplifier 16 is coupled to the gate of p-channel regulator pass-transistor 18. Pass transistor 18 has a first source/drain coupled to node VIN and a second source/drain coupled to node VOUT. Two resistors 20 and 22 are series coupled between VOUT and ground to divide the voltage to a desired level. The node between the two resistors is fed back to amplifier 16. A capacitor 24 (shown in FIG. 1 as a 10 $\mu$F capacitor) is coupled between VOUT and ground for output voltage stability. A capacitor 26 is coupled between VREF and ground for filtering.

In steady-state operation, the control voltage produced by amplifier 16 imposes a working point to pass transistor 18, resulting in a stable output voltage at K*VREF, where K is set by the voltage divider resistors 20 and 22. Bandgap voltage source 10 is designed to output a precise VREF despite temperature, process variations, and VCC supply spread. Depending upon the expected current drive capability and voltage regulation quality, amplifier 16 can be relatively large and consume an extremely high level of current.

Mobile communications devices, such as GSM mobile phones, use several LDOs 10 to supply all the electronic devices in the phone. Embedded LDOs have two states: ON or OFF. In the OFF state, there is very low quiescent current consumption, but also no current drive available. In the ON state, there is full quiescent current consumption, but the maximum output rated current is available.

When an LDO is in an ON state, there is considerable current consumption, even though minimal current is being provided to the other circuitry that is in an idle state. One major contributor of LDO current consumption is the error amplifier bias current (IBIAS). A second contributor to current consumption is the reference voltage generator current (IBG). A third contributor of current consumption is the leakage on the error amplifier feedback divider circuit (IFBK). The magnitudes of these currents are dependent upon the maximum rated current of the LDO and on the required LDO line and load regulation.

In a mobile phone, the various circuitry powered by the LDOs will be in an idle state up to 90% of the time. When the mobile phone is in a mode referred to as "deep sleep", there is no CPU activity and most of the mobile phone's functions are in an idle state. In this idle state, most of the current sink from the battery is not used for mobile phone activities, but is lost in the LDO's biasing current. Accordingly, the current consumption of the LDO during the idle states has a significant effect on battery life.

FIG. 2 illustrates an embodiment of an LDO 30 that can greatly reduce the amount of current consumed during the deep sleep states. For purposes of illustration, reference numerals from FIG. 1 are used to illustrate similar parts for a given LDO design.

LDO 30 uses both a main bandgap voltage source 12 and a sleep bandgap voltage source 32, both coupled to VCC. The main bandgap voltage is coupled to an input of error amplifier 16 through switch 34 and the sleep bandgap voltage source is coupled to an input of error amplifier 36 through switch 38. Switches 34 and 38 are controlled by sleep logic 40 such that there states are complementary (as indicated by inverter 42): when switch 34 is closed, switch 38 is open and vice-versa.

Similarly, bias current source 14 is coupled to amplifier 16 through switch 44 and to amplifier 36 through switch 46. Sleep logic controls switches 44 and 46 such that there states a complementary as well, as indicated by inverter 48. Further, switches 34 and 44 always maintain the same state and switches 38 and 46 always maintain the same state.

The outputs of both amplifier 16 and 36 are both coupled to the gate of pass transistor 18. The divided voltage node between resistors 20 and 22 is coupled to the inputs of both amplifiers 16 and 36. Sleep logic 40 is also coupled to main bandgap voltage source 12 to either enable or disable its operation.

The sleep bandgap voltage source 32 is a simple design without temperature or process compensation to consume less than 5 $\mu$A, wherein the main bandgap voltage source 12 of the type typically used in a precision LDO application consumes about 100 $\mu$A due to a more complex design. The important factor is that the sleep bandgap voltage source consumes significantly less current during operation.

Further, the sleep error amplifier 36 is significantly smaller than the main error amplifier 16. The smaller amplifier 36 is less precise than the larger amplifier 16, but also consumes less bias current. The smaller amplifier 36 need only provide sufficient current to power the digital and RF circuitry during deep sleep state, i.e., the leakage current for the processors, DSPs and memories. Amplifier 36 also maintains the voltage on the VOUT output across capacitor 24.

In operation, during normal operation and paging mode, the main bandgap voltage source 12 is coupled to the main error amplifier 16 through switch 34 and the bias current source 14 is coupled to the amplifier 16 through switch 44. Accordingly, sleep bandgap voltage source 32 is de-coupled from error amplifier 36 and bias current source 14 is decoupled from error amplifier 36. The operation of this circuit during normal and paging mode is almost the same as that shown in FIG. 1.

In deep sleep mode, however, bandgap voltage source 12 is de-coupled to the main error amplifier 16 by switch 34 and the bias current source 14 is de-coupled to the amplifier 16 by switch 44. Sleep bandgap voltage source 32 is coupled to error amplifier 36 by switch 38 and bias current source 14 is coupled to error amplifier 36 by switch 46.

In deep sleep mode, therefore, the sleep error amplifier 36 drives the pass-transistor 18 instead of main amplifier 16. Further the sleep bandgap voltage source 32 sets the reference voltage VREF and main bandgap voltage source 12 is disabled to eliminate its current consumption. Since both the sleep bandgap voltage source 32 and the sleep error amplifier 16 consume significantly less current than their normal/paging mode counterparts, the current consumed by each LDO in deep sleep mode is greatly reduced. Since there may be several LDOs used to supply voltage to other circuits in the system, the overall current consumption during deep sleep mode can be significant.

Capacitor 24 remains charged by the sleep error amplifier 36 during deep sleep mode and capacitor 26 remains charged by the sleep bandgap reference 32. Therefore, transitions from deep sleep mode to a full ON state are fast relative to a typical LDO in an OFF state, because of the charged states of capacitors 24 and 26.

Accordingly, the LDO 30 provides significant advantage over the prior art. As discussed above, there is a drastic reduction of LDO current consumption during periods in which there is no need for maximum rated current or high precision on load and line regulation. Second, the only additional circuitry necessary to implement the circuit of FIG. 2 relative to the circuit of FIG. 1 is the small amplifier 36 and the sleep bandgap 32. These circuits have a relatively small impact, since larger parts, the resistors 20 and 22 and the pass transistor 18 are shared between the normal operation and sleep components. Third, the LDO 30 combines low current consumption in sleep mode with fast transition to active mode. This makes the LDO adaptable to many applications with consumption and real-time constraints, such as mobile applications and specifically GSM applications.

FIG. 3 illustrates a generalized block diagram showing the LDOs 30 used in a mobile phone application. The mobile phone 50 includes an analog baseband chip 52, a digital baseband chip 54 and an RF chip 56. The RF chip 56 includes the modulation and demodulation circuitry and the GSM interface (for a GSM device). The digital baseband chip includes one or more multipurpose processors 58, one or more DSPs 60, a memory interface 62, GSM peripherals 64 and general-purpose peripherals 66. The analog baseband chip 52 includes a power management and LDO circuitry 69, including a plurality of LDOs 30 powered by battery 70 and sleep logic 40 (see FIG. 2). Sleep logic 40 places the LDOs in the sleep state in response to control signals from the digital section that the circuitry is entering a deep sleep mode and returns the LDOs to a normal, active state in response to control signals from the digital section indicating that an active state is being entered. The analog baseband chip 52, further includes a GSM interface 72 coupled to the GSM peripherals 64, a general purpose interface 74 coupled to the general purpose peripherals 66, and audio interface 76 coupled to the DSP 60, a baseband codec 78 coupled to the RF chip 56, and RF auxiliary circuit 79 coupled to the RF chip 56, and audio circuit 80 coupled to the ear speaker and microphone, and an auxiliary circuit 82 coupled to other external devices, such as LEDs.

While the mobile communication device 50 is shown as three distinct chips in FIG. 3, improved fabrication techniques may allow functions of the various chips to be integrated in a single chip.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A mobile communication device comprising:

digital baseband circuitry;

radio frequency modulation circuitry;

power circuitry for powering said digital baseband circuitry and said radio frequency modulation circuitry including one or more regulators comprising:

a first voltage reference;

a second voltage reference with a significantly lower current consumption than said first voltage reference;

a bias current supply;

a first amplifier;

a second amplifier which consumes less bias current than said first amplifier; and sleep logic for:

coupling said first voltage reference to said first amplifier and said bias current supply to said first amplifier in a normal mode; and coupling said second voltage reference to said second amplifier and said bias current supply to said second amplifier in a sleep mode.

2. The mobile communication device of claim 1 wherein said sleep logic decouples said first voltage reference from said first amplifier in said sleep mode.

3. The mobile communication device of claim 1 wherein said sleep logic decouples said bias current source from said first amplifier in said sleep mode.

4. The mobile communication device of claim 1 wherein said first and second voltage references are bandgap voltage references.

5. The mobile communication device of claim 1 wherein said power circuitry further includes an output voltage capacitor charged by said first amplifier in normal mode and by said second amplifier in sleep mode.

6. The mobile communication device of claim 1 wherein said power circuitry further includes an filtering capacitor charged by said first voltage reference in normal mode and by said second voltage reference in sleep mode.

7. The mobile communication device of claim 1 wherein said regulators are low dropout regulators.

* * * * *